United States Patent [19]

Sawaguchi et al.

[11] 4,301,484
[45] Nov. 17, 1981

[54] CASSETTE LOADING DEVICE OF TAPE RECORDER

[75] Inventors: Masahiro Sawaguchi; Masami Sasaki; Hiroshi Hosoya; Toshiichiro Oka, all of Yokohama, Japan

[73] Assignee: Victor Company of Japan, Limited, Yokohama, Japan

[21] Appl. No.: 86,260

[22] Filed: Oct. 18, 1979

[30] Foreign Application Priority Data

Oct. 24, 1979 [JP] Japan .................................. 53-130635

[51] Int. Cl.³ ............................................. G11B 15/66
[52] U.S. Cl. .................................................. 360/96.6
[58] Field of Search ................ 360/96.6, 96.5, 92-93, 360/95

[56] References Cited

U.S. PATENT DOCUMENTS

| 3,902,193 | 8/1975 | Hapke | 360/96.6 |
| 4,065,800 | 12/1977 | Wilson et al. | 360/96.5 |

FOREIGN PATENT DOCUMENTS

| 4527029 | 3/1967 | Japan | 360/96.5 |
| 52-2409 | 1/1977 | Japan | 360/96.6 |
| 622163 | 2/1977 | U.S.S.R. | 360/96.5 |

Primary Examiner—John H. Wolff
Attorney, Agent, or Firm—Lowe, King, Price & Becker

[57] ABSTRACT

A cassette loading device of a tape recorder comprises a cassette holder and a pair of link mechanisms which are disposed to the right and to the left of the cassette holder and which operatively connect the cassette holder to the stationary portions of the tape recorder so as to allow the cassette holder to smoothly move between a cassette loading position and a disengaged position giving easy access to the cassette. Each of the pair of link mechanisms includes a first link arm that has one end rotatably mounted on the corresponding stationary portion and an opposite end slidably mounted on the cassette holder for travel within communicating straight and arcuate slot portions; a second link arm has one end rotatably mounted on the cassette holder and an opposite end slidably mounted on the corresponding stationary portion. The first and second link arms of each link mechanism intersect and pivot each other at their intersection. For synchronous movement of one of the link mechanisms with the other, the first link arms and/or second link arms are interconnected for a unitary movement.

6 Claims, 8 Drawing Figures

CASSETTE LOADING DEVICE OF TAPE RECORDER

BACKGROUND OF THE INVENTION

1. Field of the Invention

The present invention relates to a cassette loading device of a tape recorder, and more particularly to a cassette loading device including a cassette holder and a conveyance mechanism for the cassette holder.

2. Prior Art

In the tape recorder market, specially so-called tape deck market, widespread are component types wherein a cassette is loading in a generally vertical direction to a front face panel of a cassette deck (in a direction generally parallel to the front face panel of the cassette deck), and is placed with its capstan side down so that letter on a label attached to the cassette on its face stand right for ease of reading.

Most of the conventional cassette decks employ a cassette holder as a means for cassette loading in which this cassette holder moves through a circular arc upon cassette loading.

FIG. 1 is a sectional view showing a conventional moving mechanism for a cassette holder to effect movement of the cassette deck through a circular arc, in which a cassette 1 is received in a cassette holder 2 which is rotatable about a shaft 3 between a cassette loaded position (shown by the solid line) and a cassette unloaded position (shown by two dots-chain line). With this arrangement, a capstan hole 4 of a cassette moves through a circular arc until it receives a capstan 5 when loaded, however, although the capstan hole 4 must measure 4.5 mm in diameter according to a standard, the diameter of the capstan 5 may take any value ranging from 2 mm to 3 mm and besides there is the trend to employ a capstan with a large diameter to hold extremely close tolerances upon finish of a product by grinding, holding surface vibration of the capstan at extremely low level, the capstan with a diameter not smaller than 2.5 mm being widespread in use at present. In such a cassette deck provided with a capstan having a diameter of 2.5 mm, for example, a radius R of a circular arc along which the capstan hole 4 moves must be 30 mm at the minimum for a practical use, and if the radius R is smaller than this value, the capstan hole 4 contacts with the capstan 5 or in a worse case the cassette 1 abuts the leading edge of the capstan 5, thus making it impossible to effect cassette loading operation. The present trend demands component type cassette decks having a shorter height, for example, one having a front face panel with 100 mm in height, in this case it is hardly possible to assure the minimum radius as mentioned above.

OBJECT OF THE PRESENT INVENTION

The task of the present invention is to provide a cassette loading device which is suitable for a tape recorder that is small and limited in its height, wherein a cassette holder for a cassette is allowed to move smoothly without any interference contact between a capstan and a capstan hole of the cassette and to take a position giving easy access to the cassette whereby the cassette can be easily inserted into or removed from the cassette holder and wherein those movable parts of the device are disposed within a height substantially the same as that of the cassette.

SUMMARY OF THE INVENTION

According to a cassette loading device of a tape recorder according to the present invention a pair of link mechanisms are disposed to the right and to the left of a cassette holder, respectively, and operatively connect the cassette holder to stationary portions of the tape recorder so as to allow movement of the cassette holder between a cassette loading position and a disengaged position giving easy access to the cassette. Each of the pair of link mechanisms includes a first link arm that has one end rotatably mounted on the corresponding stationary portion and an opposite end slidably mounted on the cassette holder. It also includes a second link arm that has one end rotatably mounted on the cassette holder and an opposite end slidably mounted on said the corresponding stationary portion. The first and second link arms of each link mechanism intersect each other and pivot on each other at their intersection. For synchronous movement of one of the link mechanisms with the other, the first link arms are interconnected for a unitary movement and/or the second link arms are interconnected for a unitary movement. Whereby as the intersecting angle of the first and second link arms varies, the cassette holder is allowed to move between said two positions.

The arrangement wherein at least one pair of link arms are interconnected for a unitary movement secures the smooth movement of the cassette holder toward the capstan regardless of the stress distribution applied to the cassette holder when subjected to the manipulation by an operator.

According to the preferred embodiment of the invention, the one and opposite ends of all of the link arms are equally spaced from the corresponding pivots that are disposed at the intersections, thus securing the straight movement of the cassette holder in parallel to the axis of the capstan. This dimensional relationship however is not essential to the present invention. Because the above described task can be accomplished also by moving the cassette holder along a circular arc that is sufficiently large enough to secure smooth insertion of the capstan into the capstan hole of the cassette, and in this case said dimensional relationship does not hold.

Preferably, in order to reduce the amount of retarding movement of the cassette holder from its cassette loading position and to minimize the space required, the cassette holder is provided with means whereby the cassette holder can pivot about the one ends of said second link arms right after the cassette holder has reached a position wherein the cassette has been removed from the capstan.

According to the preferred embodiment of the present invention, the opposite ends of the first link arms of the pair of link mechanisms that are disposed to the right and to the left of the cassette hodler, are received by a pair of slots with which the cassette holder is formed, each of these slots includes a straight slot portion and a circular arc slot portion. This arrangement allows the cassette holder to pivot about the one ends of said second link arms. During this pivotal movement of the cassette holder the opposite end of each of the first link arms is disposed in the corresponding circular arc slot portion.

The present invention is further described hereinafter in connection with the preferred embodiment illustrated in the accompanying drawings.

DESCRIPTION OF THE PREFERRED EMBODIMENT

Figure 1:
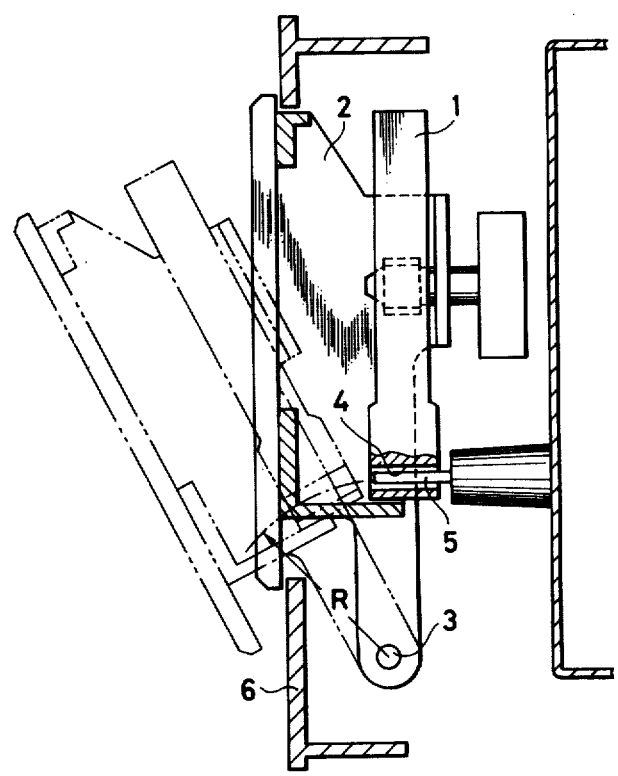
FIG. 1 is a longitudinal section of a part of a tape recorder showing, in schematic, a cassette loading device according to the prior art.

The preferred embodiment of a cassette loading device according to the present invention is hereinafter described in connection with FIGS. 2 through 8 of the accompanying drawings, wherein like reference numerals are used to designate like parts throughout various views.

Figure 3:
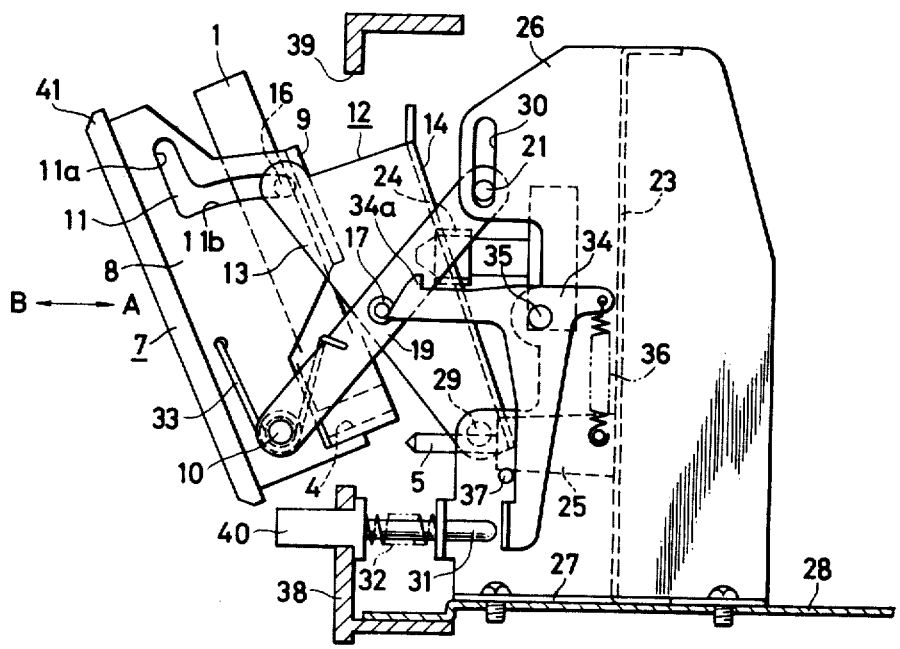
FIG. 3 is the same view as FIG. 2 but the cassette loading device is in the second disengaged position.
Figure 8:
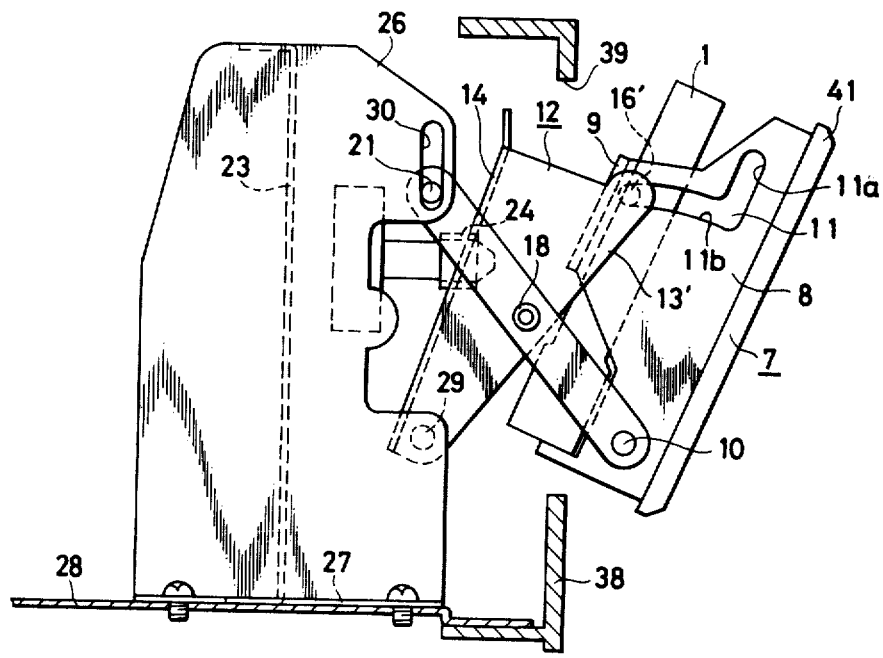
FIG. 8 is a longitudinal section of a part of the tape recorder showing, in schematic, the left side of the cassette loading device shown in FIGS. 2 to 4 but the device is in the second disengaged position.

Referring to FIGS. 3 and 8, one of a pair of mechanisms of the cassette loading device disposed to the right of the cassette holder is shown in FIG. 3, while the other mechanism of the pair disposed to the left of the cassette holder is shown in FIG. 8.

Figure 2:
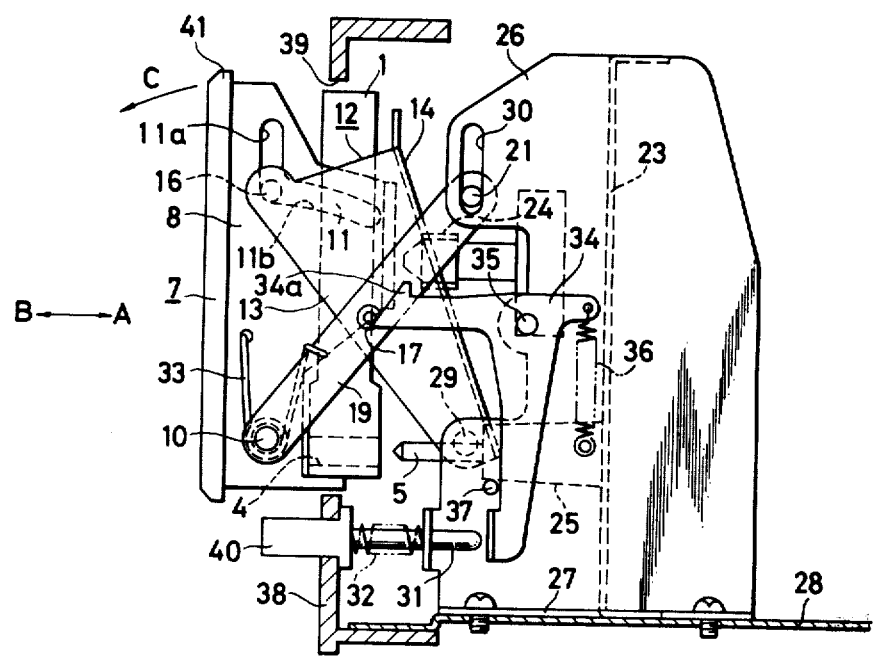
FIG. 2 is a longitudinal section of a part of a tape recorder showing, in schematic, the right side of a cassette loading device according to the present invention, the device being in the first disengaged position.
Figure 4:
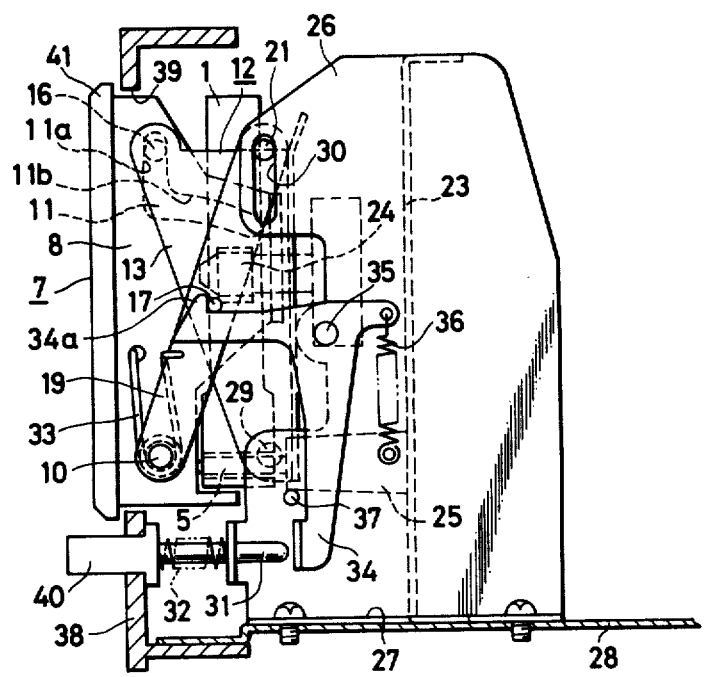
FIG. 4 is the same view as FIG. 2 but the cassette loading device is in the cassette loading position.

Referring to FIGS. 3, 2 and 4, FIG. 3 shows a second disengaged position that gives an easy access to the cassette, FIG. 2 shows a first disengaged position, and FIG. 4 shows a cassette loading position. It will be understood as the description proceeds that when loading the cassette the cassette holder is moved from FIG. 3 position to the FIG. 4 position via FIG. 2 position, while when removing the cassette the cassette holder is moved from FIG. 4 position to the FIG. 3 position via FIG. 2 position.

Referring to FIGS. 2 through 4 wherein the reference numeral 1 designates a cassette that may be loaded by means of a cassette holder 7, this cassette holder 7 is one piece product of a synthetic resin and includes integrally formed side plate portions 8 and back plate portion 9. Each of the side plate portions 8 of the cassette holder 7 has a shaft 10 embedded to a lower portion thereof, and formed on an upper portion of each side plate portion 8 is a slot 11 consisting of a straight portion 11a extending in substantially parallel to the back plate 9 and a circular arc portion 11b extending along a circular arc with said shaft 10 as its center.

Figure 5:
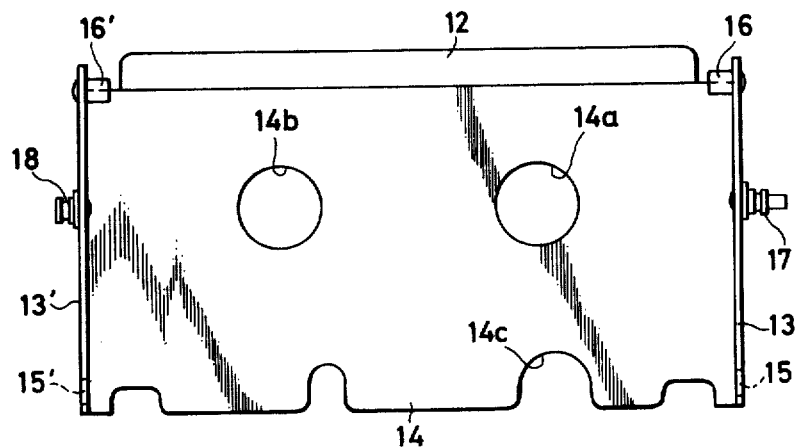
FIG. 5 is a plan view of a guide plate of the cassette loading device shown in FIGS. 2 to 4.

The reference numeral 12 designates a guide plate for the cassette holder which, as shown in FIG. 5, is composed of first link arms 13 and 13' and a substantially flat interconnecting member 14, wherein right and left link arms 13 and 13' are formed with holes 15 and 15', respectively, at respective one end portions thereof, the link arms 13 and 13' have inwardly extending pin 16 and 16' embedded to the respective opposite end portions thereof, and the link arm (right) 13 and link arm (left) 13' have a shaft 17 and a shorter shaft 18, respectively, embedded to respective center portions thereof.

Figure 6:
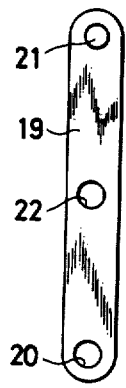
FIG. 6 is a plan view of a second link arm of the cassette loading device shown in FIGS. 2 to 4.
Figure 7:
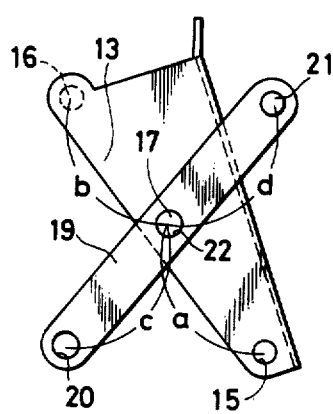
FIG. 7 is a diagram showing the dimensional relationship between cooperating first and second link arms of the cassette loading device.

The reference numeral 19 designates a second link arm, which, as shown in FIG. 6 is provided with a hole 20 at one end portion thereof, a pin 21 at the opposite end portion thereof, and a hole 22 at center portion thereof.

The reference numeral 23 designates a mechanism carrying base mounted substantially upright and the mechanism base 23 is provided with two rotatable reel receiving shafts 24 projecting therefrom and with a rotatable capstan 5 received by a capstan bearing 25 and projecting therefrom.

The reference numeral 26 designates a link carrying plate (stationary member) which serves also as an attaching member for the above-mentioned mechanism carrying base 23 and which has a bent lower edge portion 27 screwed to a cassette deck base plate 28. Embedded at a lower portion of this link carrying plate 26 is a shaft 29 disposed in the hole 15 and a slot 30 is formed within an area above and in line with the shaft 29 for receiving the pin 21 of the second link arm 19 to permit same to slide.

Referring to FIGS. 2 to 4, only right-hand side of the device according to the present invention is shown wherein one of the pair of side plate portions 8, one of the pair of first link arms 13, one of the pair of second link arms 19 and one of the pair of link carrying plates 26 only are shown, however, the left-hand side of the device is similarly constructed as shown in FIG. 8.

The interconnecting member 14 is formed, by piercing, with holes 14a and 14b to permit the reel receiving shafts 24 to pass therethrough, respectively, and with a cutout 14c to permit the capstan bearing 25 to pass therethrough, as shown in FIG. 5 because the guide plate 12 is rotatable about the shaft 29 and the interconnecting member 14 which is disposed between the cassette 1 and the mechanism base 23 assumes a position wherein it is disposed in parallel with and near the mechanism base 23 when the device is in the position shown in FIG. 4 wherein the cassette is loaded. Besides the guide plate 12 has a function to conceal the drive and the other things of the mechanism when the cassette holder is in the disengaged position shown in FIG. 2 or FIG. 3.

The first link arm 13 is pivotable with its one end rotatably mounted on the shaft 29 formed on the link carrying plate 26, and has the inwardly embedded pin 16 to pass through the slot 11, while, the second link arm 19 disposed outwardly of the corresponding first link arm 13 has the hole 20 formed at one end portion thereof to receive the shaft 10 on the side plate portion 8 of the cassette holder and has the pin 21 on the opposite end portion to pass through the hole 30, the second link arm having the hole 22 to receive the shaft 17 on the first link arm 13 so that the second link arm lies across or intersect the first link arm. Therefore, the first link arm 13 and the second link arm 19 cooperate to operate as a linkage, and, upon loading or unloading a cassette, the cassette holder is allowed to advance towards or retard from the link carrying plate 26 as the intersecting angle between the first and second link arms 13 and 19 varies. With this arrangement the accurate parallel movement can be assured if the following dimensional relationship holds, that is, $a=b=c=d$, where, in FIG. 7, a and b refer to the first link arm 13 and represent a distance between the shaft 17 and the hole 15 and a distance between this shaft and the pin 16, respectively, and c and d refer to the second link arm 19 and represent a distance between the hole 20 and the hole 22 and a distance between the hole 22 and the pin 21, respectively, and this relationship is satisfied in this embodiment.

The above mentioned dimensional relationship is necessary when it is required to effect the parallel movement along a straight line, however, this limitation can be eliminated if the cassette holder 7 is moved, instead of the parallel movement, along a circular arc with an extremely large radius, and in this case since the center of the circular arc is not real but imaginary, the height of the cassette deck can be designed small as much as that of the preferred embodiment, and since the radius can be made large sufficiently as desired, smooth action upon inserting the capstan into the cassette is assured without any hindrance.

The reference numeral 33 indicates a torsion spring which winds the shaft 10 of the cassette holder 7 with one end fixed to the side wall portion 8 and with the opposite end abutting against the second link arm 19 so that with the same torsion spring the cassette holder 7 is biased to effect the parallel movement in a direction of an arrow B and the circular arc movement in a direction of an arrow C.

The reference numeral 34 designates a lock arm which is rotatably supported by a shaft 35 embedded to the link carrying plate 26 and is biased by a spring 36 clockwise, and with this arrangement the lock arm can lock the pin 17 on the first link arm 13, the clockwise rotation of the lock arm subject to the spring being limited by a stopper pin 37.

The reference numeral 38 designates a front face panel of the cassette deck which is formed with an opening 39 allowing the cassette holder 7 to pass therethrough upon its advancing or retarding movement and which is provided at its corner portion an inject button 40, wherein pressing this inject button 40 against a spring 32 causes, via an inject rod 31, to rotate the above-mentioned lock arm 34 counterclockwise, thus unlocking or releasing the above-mentioned pin 17.

The reference numeral 41 designates a cassette door for closing the opening 39 of the front face panel, the cassette door being fixed by screws to the front face of the cassette holder 7.

The construction of the cassette loading device according to the present invention has been described hereinabove, now its operation is described in the following.

In the second disengaged position shown in FIG. 3, the cassette holder 7 is in a position angularly displaced, about the shaft 10, counterclockwise under the action of the spring 33, and the guide plate 12 is angularly displaced, about the shaft 29, counterclockwise too. In this state, the pin 16 at the upper portion of the first link arm 13 is disposed in the circular arc portion 11b and abuts its terminal end to define the angular position of the cassette holder 7.

In this position, the cassette door 41 is spaced from the front face panel 38 by a sufficient amount so that the cassette 1 can be picked up from or inserted into the cassette holder 7 easily.

In the casette door 41 receiving the cassette 1 is pressed in a direction indicated by an arrow A, the cassette holder 7 pivots clockwise about the shaft 10 against the spring 33. It is to be noted that since the distance between the pin 16 and pin 10 is unchanged as far as the pin 16 of the first link arm 13 is disposed in the circular arc portion 11b of the slot 11, the guide plate 12 and the second link arm 19 remain in their respective illustrated positions of FIG. 3 and the cassette holder 7 alone is allowed to pivot until the pin 16 reaches the straight portion 11a of the slot 11, that is, until the first disengaged position shown in FIG. 2 is assumed.

In the position shown in FIG. 2, the cassette holder 7 and cassette 1 are disposed in parallel relationship to the mechanism carrying base 23 in a spaced relationship and the capstan hole 4 is aligned with the capstan 5 just before receiving same. In this position the pin 16 of the first link arm 13 is disposed in the straight portion 11a of the slot 11 of the cassette holder 7 so that if the cassette door 41 is pressed further in the direction indicated by the arrow A, the pin 16 moves upwards along the straight portion 11a and the pin 21 of the second link arm 19 along the slot 30 of the link carrying plate 26, allowing the first link arm 13 and the second link arm 19 to vary their intersecting angle thus permitting the parallel movement of the cassette holder 7 in the direction indicated by the arrow A. Therefore, allowing the capstan 5 to pass through the capstan hole 4, the cassette 1 is brought into a position when the device is in the cassette loading position shown in FIG. 4. The cassette holder 7 is kept in the illustrated position in FIG. 4 against the biasing force of the spring 33 since the hook portion 34a of the lock arm 34 engages the shaft 17 embedded to the first link arm 13 to lock same.

The cassette loading being carried out by steps in the above described order, the cassette unloading is carried out by the same steps in the reverse order. Explaining this in the following, when the device is in the cassette loading position shown in FIG. 4, pressing the inject button 40 causes the lock arm 34 to rotate counterclockwise, thus releasing the lock on the above mentioned shaft 17 on the intersection of the link arms. This allows the second link arm 19 to rotate clockwise and the first link arm 13 to rotate counterclockwise owing to the action of the spring 33. As the angular movement of the cassette holder 7 is prevented because the pin 16 of the first link arm 13 is disposed in the straight portion 11a of the slot 11, the cassette holder 7 is allowed to effect the parallel movement, towards the position shown in FIG. 3, before moved backwards to take a position wherein the capstan hole 4 is spaced from the capstan 5 (the first disengaged position of the cassette holder).

At the position shown in FIG. 2, the parallel movement of the cassette holder 7 is followed by the counterclockwise rotary movement thereof also owing to the action of the spring 33 till plunging into the position shown in FIG. 3 (the second disengaged position of the cassette holder) because the above mentioned pin 16 has been put into the circular arc portion 11b of the slot 11.

It is to be understood that the position of FIG. 2 represents the transitional state during cassette loading or unloading process and so does not indicate that the cassette holder 7 stops temporarily to stay in this position.

It can be recognized from the description of the preferred embodiment that a special arrangement has been employed to secure smooth and continuous movement of the cassette holder so that even if an operator presses any desired portion, such as, the right edge or the left edge of the cassette door, of the cassette door, the pair of linkage mechanisms move synchronously.

In the preferred embodiment, there is employed the guide plate 12 as shown in FIG. 5 wherein the right and left link arms 13 and 13' are integrated or interconnected by the interconnecting member 14 that has a rigidity sufficiently great enough to withstand a twisting force. This secures a unitary pivotal motion of the link arms 13, 13' about the shaft 29 because the guide plate 12 is pivotable about this shaft 29. This unitary motion of the link arms 13, 13' secures synchronous and smooth motion of the link mechanisms in such a manner that the intersecting angle of the cooperating link arms of one of the link mechanisms varies at the same timing and by the same degree with the intersecting angle of the cooperating link arms of the other link mechanism.

Although, in the preferred embodiment, the cassette holder is allowed to pivot after its parallel movement to the axis of the capstan, such motion may be replaced by the parallel movement only although in this case the amount of the parallel movement necessarily increases as compared to the preferred embodiment.

It can also be recognized that the movable parts or members constituting the cassette loading device, such as, cassette holder 7, guide plate 12, link arms 19, are disposed to occupy a space that has substantially the same height as the cassette, thus making a significant contribution to the reduction in height of the cassette loading device.

It can also be recognized in connection with the preferred embodiment that the possibility that the capstan hole of the cassette may be brought into interference contact with the capstan is precluded because the cassette is moved in parallel to the axis of the capstan when loading the cassette, thus securing smooth engagement of the cassette with the capstan even if the diameter of the capstan is increased.

It can also be recognized that the cassette loading device according to the present invention secures accurate loading of the cassette regardless of the location on the cassette door of the application of force by manipulation of an operator because of synchronous movement of the pair of link mechanisms.

It can also be recognized in connection with the preferred embodiment that a manipulating space enough for inserting the cassette into the cassette holder or removing same from the latter is provided because of pivotal movement of the cassette holder before assuming the second disengaged position shown in FIG. 3.

It can also be recognized that the cassette loading device according to the present invention can be applied to a thinner component-type cassette deck that has a considerably reduced height because the height occupied by the cassette loading device of the present invention is substantially the same height as that of the cassette.

What is claimed is:

1. A cassette loading device of a tape recorder comprising:
   (a) a cassette holder;
   (b) a pair of link mechanisms arranged at opposite ends of said cassette holder, said link mechanisms interconnecting said cassette holder to stationary members of the tape recorder enabling the cassette holder to move between cassette loading and disengaged position, said link mechanisms each including a first link arm having one end rotatably secured to said stationary members and an opposite end slidably engaging said cassette holder, and a second link arm having one end rotatably secured to said cassette holder and an opposite end slidably engaging said stationary members, said first and second link arms of each link mechanism intersecting and pivotally engaging each other at the intersection, wherein said opposite ends of the first link arm in each link mechanism are received by a pair of slots formed in said cassette holder, each of said slots including a straight slot portion and an arcuate slot portion, said cassette holder being allowed to pivot about the ends of said second link arms when said opposite ends of the first link arms are received in said arcuate slot portions; and
   (c) means for interconnecting one of said first or second link arms for unitary movement.

2. A cassette loading device as claimed in claim 1, wherein said ends of the first and second link arms are equally spaced from the corresponding pivots located at the intersections of said link mechanisms.

3. A cassette loading device as claimed in claim 2 or claim 1, wherein said interconnecting means include a member interconnecting at least one of the pair of said first link arms and the pair of said second link arms for said unitary movement, said member being pivotable at a lower portion thereof and being arranged so as to assume a position wherein said member is disposed in parallel with a mechanism base when said cassette holder is in cassette loading position, whereby said member conceals the drive mechanism of the tape recorder.

4. A cassette loading device as claimed in claim 1, wherein said cassette holder moves along a circular arc.

5. A cassette loading device according to claim 1, wherein said first and second link arms of each link mechanism have a length less than the height of a cassette to be received in said cassette holder when said cassette holder is in a cassette loading position.

6. A cassette loading device according to claim 1, wherein said straight and arcuate slot portions formed in the cassette holder together form a substantially L-shaped slot.

* * * * *